Nov. 6, 1962    G. UTZ    3,062,165
DEVICE FOR USE ON SEWING MACHINES FOR THE AUTOMATIC
PRODUCTION OF ORNAMENTAL STITCHES
Filed July 22, 1959    5 Sheets-Sheet 1

Nov. 6, 1962 G. UTZ 3,062,165
DEVICE FOR USE ON SEWING MACHINES FOR THE AUTOMATIC
PRODUCTION OF ORNAMENTAL STITCHES
Filed July 22, 1959 5 Sheets-Sheet 3
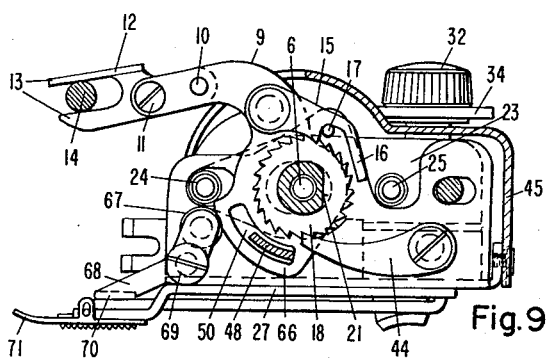
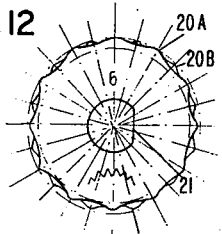
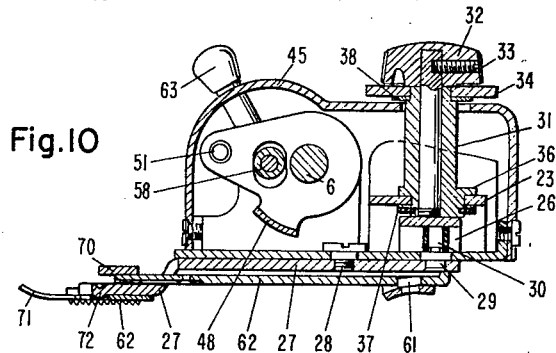
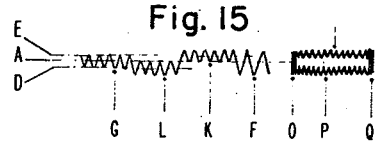
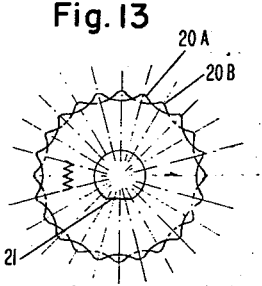
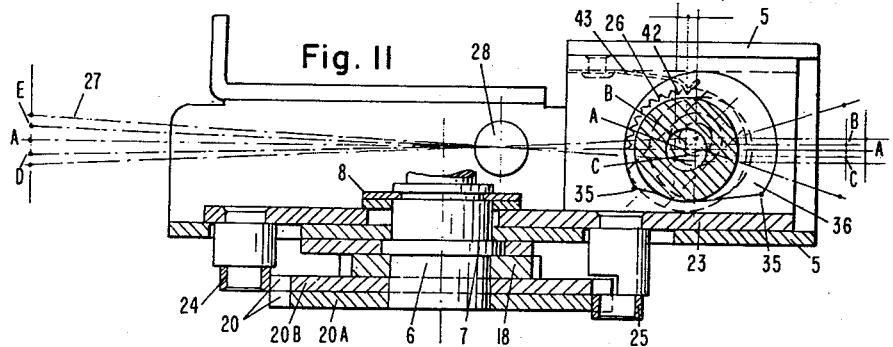

United States Patent Office 3,062,165
Patented Nov. 6, 1962

3,062,165
DEVICE FOR USE ON SEWING MACHINES FOR THE AUTOMATIC PRODUCTION OF ORNAMENTAL STITCHES
Georg Utz, Bremgarten, Aargau, Switzerland
Filed July 22, 1959, Ser. No. 828,883
Claims priority, application Switzerland July 23, 1958
6 Claims. (Cl. 112—160)

The invention relates to a device for use on sewing machines for the automatic production of ornamental stitches which device is detachably located on the material presser rod and has a foot pivotably cross wise to the longitudinal direction of stitching and also a material mover arranged in slots in the foot movable in the direction of the sewing and by which the movement of the needle rod via a step-by-step mechanism effects the turning of a template.

It is characterised in that the control cam of the template acts on a control slide on which control means are arranged which permit of varying the width of the stitch during the sewing, moving the middle position of the foot to the left or right and producing any desired pattern of sewing also in mirror image pattern.

Several embodiments of the subject-matter of the invention are illustrated in the accompanying drawings, in which:

FIG. 9 shows a side view as in FIG. 2 but with the template removed and cover removed.

FIG. 10 shows a cross section on line X—X of FIG. 3;

FIG. 11 shows a part diagrammatic representation on line XI—XI of FIG. 6;

FIG. 12 shows a template for ornamental stitching according to FIG. 14;

FIG. 13 shows a template for zig-zag stitching according to FIG. 15;

FIG. 14 shows a diagrammatic representation of an ornamental stitching in various variations, by way of example, produced with the template according to FIG. 12;

FIG. 15 shows a diagrammatic representation of a zig-zag stitching in various variations produced with the template according to FIG. 13;

Figure 2:
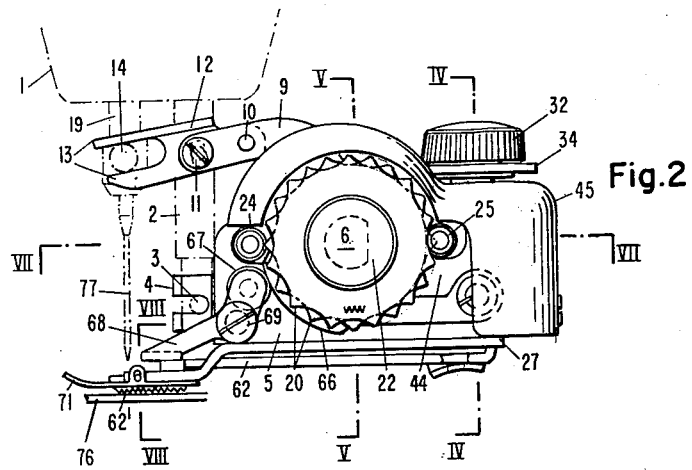
FIG. 2 shows a side view of the apparatus according to FIG. 1.
Figure 5:
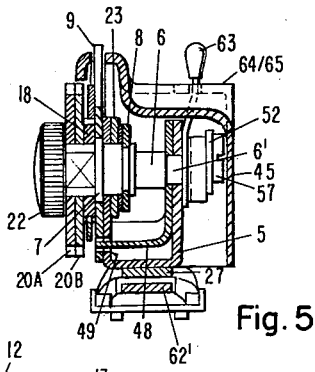
FIG. 5 shows a cross section on line V—V of FIG. 2.

On the known presser rod 2 of the sewing machine 1 there is fixed a holder 4 by means of a releasable screw 3 which according to the type of sewing machine is adjustably connected to the casing of the apparatus 5 (FIG. 2). In the latter an axle 6 is rotatably mounted and held by means of a projection 7 and a split washer 8 (FIG. 5).

A lever 9 is mounted freely pivotable on the axle 6 the end of which lever projecting from the apparatus is adjustably connected to a forked lever 12 by means of screws 10 and 11. The forked lever is so constructed that its fork 13 embraces a carrier 14 projecting from the needle rod 19 of the sewing machine and vertically reciprocable therewith. The lever 9 carries a pawl 15 (FIG. 9) under the action of a spring which in consequence of its cam-like extension 16 is controlled in its engaging action by a bolt 17 firmly connected to the casing of the apparatus 5.

A ratchet wheel 18 is firmly connected on the axle 6. Due to the up and down movement of the needle rod 19 of the sewing machine with the carrier 14 the lever 9 via the pawl 15 rotates the ratchet wheel 18 and thereby the axle 6 step by step in clockwise direction. A pawl 44 rotatably mounted under spring action on the casing of the apparatus 5 secures the ratchet wheel 18 against opposite rotation. The apparatus described thus forms a step by step mechanism for the stepwise rotation of the axle 6.

An exchangeable disc-like template 20 is also located on the axle 6 which carries two control cams 20A and 20B. The template 20 is secured against rotation relative to the axle 6 by a surface 21 and is held axially, by a screw 22, against the ratchet wheel 18. The templates are easily exchangeable by loosening the screw 22.

The profiles of the control cams 20A and 20B of the template 20 are contacted by two rollers 24, 25, which are fixed to and extend for set distances from a control slide 23. See FIG. 7. The different exchangeable templates 20 are distinguished by different heights of teeth, the differences amounting to between 0 and 2 mm. In the embodiment shown the templates 20 and the ratchet wheel 18 are each provided with 24 teeth. Upon a full rotation of the template 20 the control slide 23 thus makes twenty-four strokes which, according to the template used, can amount to a movement of 2 mm. per stroke. Thus, as one control cam turns to bring one roller to the apex of a tooth, the other control cam turns to bring the other roller into the depression between two teeth, and the control slide 23 moves in one direction. Upon further turning of the template, the first control cam permits the first roller to move into the depression between two teeth, and the second control cam brings the second roller to the apex of a tooth, and the control slide 23 moves in the opposite direction.

The control slide 23 is mounted, for reciprocating motion in longitudinal direction, inside the casing of the apparatus 5 and is secured against tilting in consequence of the forces arising due to the template motion.

The impulses transmitted from the template 20 to the control slide 23 are transmitted over a slide 26 rotatably mounted on the latter to a foot 27 whereby the foot carries out a lateral pivoting movement, as will now be explained. The foot 27 is formed as a double lever and is rotatably mounted intermediate its ends on the casing of the apparatus 5 by a screw 28 (FIGS. 10, 11). It carries at one end a roller bolt 29 engaging a slide block 30. The slide 26 with a straight slot for the slide block 30 is rotatably mounted in an eccentric bush 31 (FIG. 10) and can be rotated by means of a knob 32 and threaded set plug 33 selectively with respect to a scale disc 34 from zero to four to the left or from zero to four to the right. According to the slot tilt of the slide 26 the pivoting movement of the foot 27, resulting from movement of the control slide 23 may be varied from zero to four millimetres. As the slide 26 can be rotated in both directions it is possible to produce a mirror image of the sewing pattern.

Figure 3:
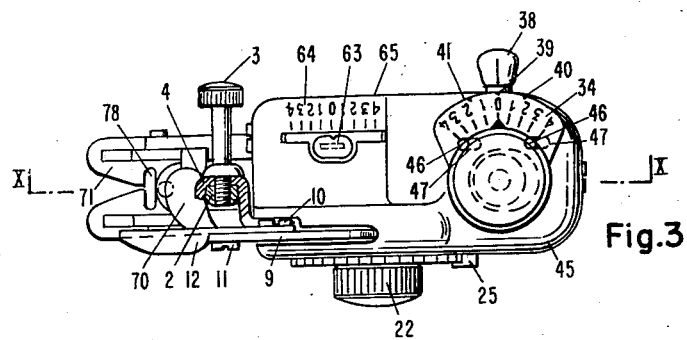
FIG. 3 shows a view of the apparatus according to FIG. 1 seen from above.
Figure 4:
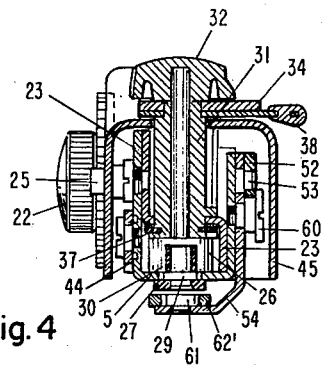
FIG. 4 shows a cross section on line IV—IV of FIG. 2.
Figure 24:
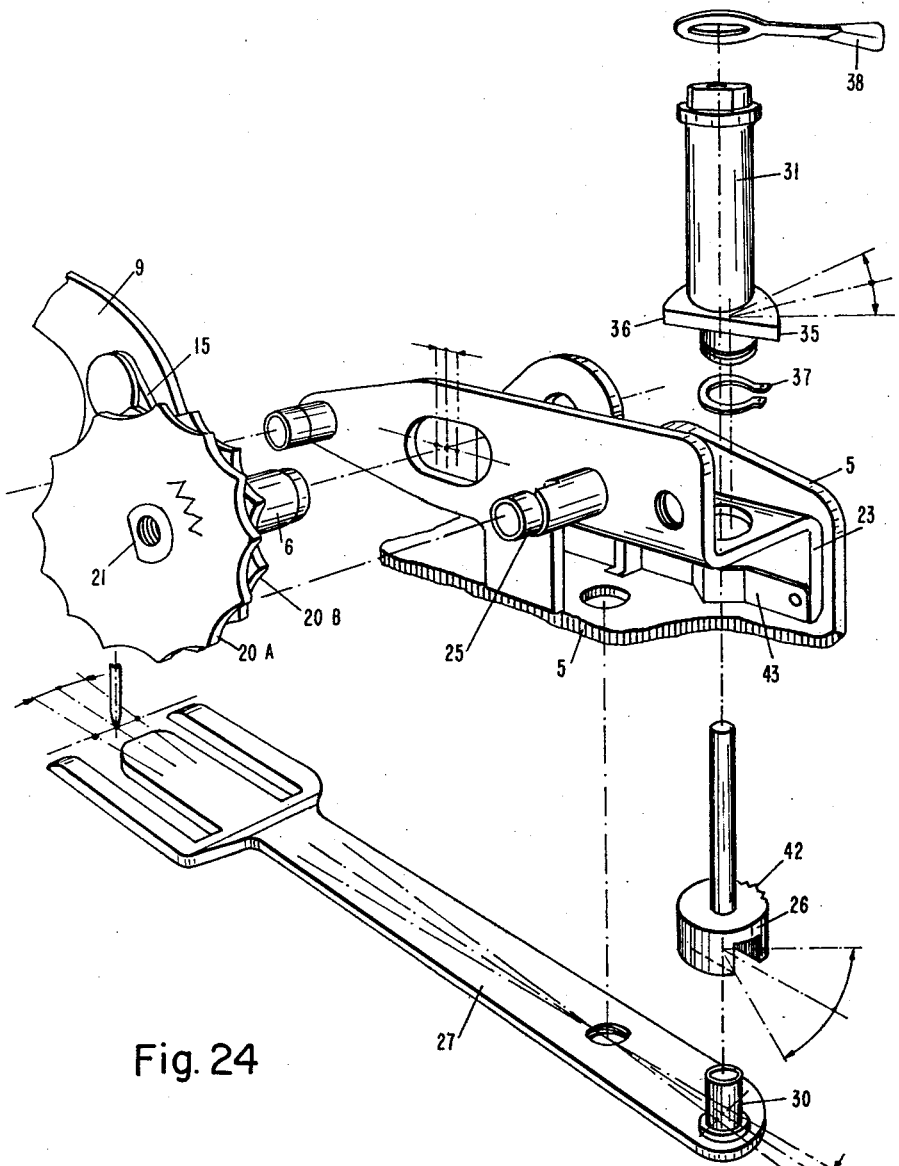
FIG. 24 is an exploded perspective view of the drive means of the lever for shifting the material, as in the embodiment illustrated in FIGS. 1 to 15.

The eccentric bush 31 is rotatably mounted in the control slide 23 and is held axially by the flange 36 formed as the limiting stop 35 (FIGS. 11 and 24) and by a split washer 37. For the rotation of the eccentric bush 31 the lever 38 firmly connected to it is used which can be selectively moved to the markings 39, 40 or 41 of the scale 34 (FIG. 3). By means of this lever, the zero point A of the slide 26 may be displaced from the centre to the left to point B or to point C (FIG. 11). Thus the foot 27 may be displaced from its middle position A to the point E. This lateral displacement of the middle position of the foot facilitates further variations of quilting stitching and ornamental stitching.

In order to obviate a rotation of the slide 26 upon displacement of the middle position of the foot to the points E or D the slide 26 is provided with notches 42 into which a suitable spring 43, fixed on the control slide 23, engages.

The scale disc 34 moves to and fro, guided by the eccentric bush 31 according to the impulses brought about by the template 20. It is secured against rotation in that pins 46, firmly connected to the scale disc 34 are guided in the slots 47 of the stationary cover of the apparatus 45.

Figure 6:
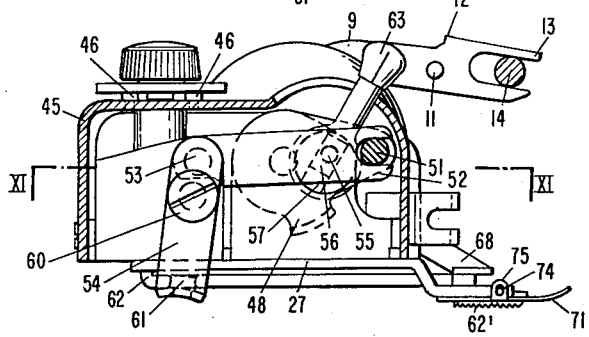
FIG. 6 shows a side view seen from the opposite side to that in FIG. 2 but with the cover cut away.
Figure 7:
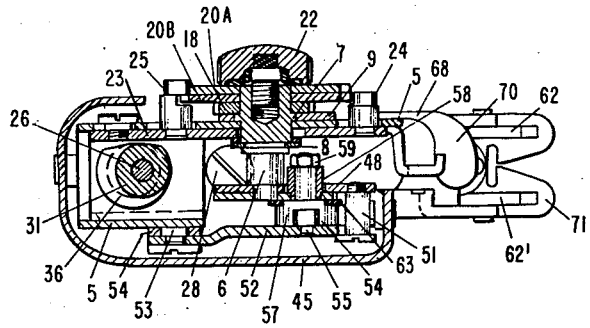
FIG. 7 shows a cross section on line VII—VII of FIG. 2.

Inside the casing of the apparatus 5 a balance 48 is pivotally mounted on the axle 6 and on the one hand is guided axially by the side wall of the casing of the apparatus 5 and on the other hand by the shoulder 6′ (FIG. 5) of the axle. The balance 48 projects through an opening 49 in the casing of the apparatus 5 and thence into a segment like slot 50 of the lever 9. (See FIGS. 5, 6, 9 and 10.) The slot 50 in the lever 9 has a certain tangential clearance relation with the balance 48 which renders it possible to pivot the balance 48 in the ryhthm of the movement of the lever 9 but at a smaller angle. The balance 48 carries the taker bolt 51 which engages the forked lever 52 (FIGS. 6 and 7). The latter is mounted on a link bolt 53 and is connected to a link 54. The fork lever carries in addition a bolt 55 and a slide block 56 (FIG. 6) which engages a slide 57. A bush 58 (FIG. 7) firmly connected to the casing of the apparatus 5 penetrates through a slot corresponding to the pivot range of the balance 48 and forms the bearing for the slide 57 which is axially secured by means of a nut 59. The link 54 is rotatably mounted on the casing of the apparatus 5 with the extension bolt 60. The bolt 60 firmly connected to the bent end of the link 54 engages in a slot of the material mover 62. This has at its other end a toothed foot 62′ with which it can seize the material and move it in longitudinal direction.

The slide 57 can be pivoted selectively by means of a lever 63 according to the scale 64 or 65 located on the cover 45 so that on adjustment on scale 64 the material mover 62′ moves the material from zero to four millimetres forwards or on adjustment on scale 65 backwards from zero to four millimetres.

The lever 9 also has a segment 66 (FIG. 9) which co-operates with the roller 67 of an angle lever 68. This is pivotally mounted on a bolt 69 and its front end is provided with a pressure part 70 which co-operates with the material mover 62′.

Figure 8:
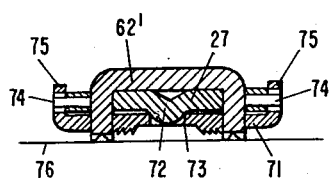
FIG. 8 shows a cross section on line VIII—VIII of FIG. 2.

The foot 27 carries on its side turned towards the stitch plate 76 a movable foot base 71. The foot 27 has a spherical downwardly bent mid section 72 (FIG. 8) which is articulately mounted in a bore 73 of the foot base 71. This latter is guided with some clearance in vertical slots 75 with the two rods 74 in the foot base 71.

The manner of operation of the apparatus is as follows:

The piece of material, not illustrated in the drawing, to be provided with an ornamental stitching placed on the stitch plate 76 is, on lowering of the presser rod 2 closely pressed onto the said stitch plate 76 by the foot base 71. The needle 77 is lowered and passes through the slot 78 of the foot base 71. Upon this downward movement of the needle rod 19 the carrier 14 pivots the lever 9 around the axle 6 whereby the pawl 15 is lifted with the cam piece 16 over the bolt 17 in anti-clockwise direction from the ratchet wheel 18 so that the axle 6 is not rotated. Simultaneously the segments 66 of the lever 9 is moved from the position shown in FIG. 9 into a position in which the segment 66 no longer makes contact with the roller 67 and the latter, and with it the angle lever 68, can pivot in clockwise direction. Thus, the pressure part 70 can be raised from the material mover 62.

With the same downward movement of the lever 9 the upper shoulder of the slot 50 presses on the balance 48 whereby the taker bolt 51 (FIG. 6) is pivoted in clockwise direction and the fork lever 52 is moved linearly according to the extent of the slot tilt on the slide 57. This movement is transmitted via the link 54 to the material mover 62 which however does not move the material as the presser part 70 of the angle lever is no longer in positive connection with it.

When the needle rod 19 moves upwards then the lever 9 together with the pawl 15, the ratchet wheel 18, the axle 6 and the template 20 is turned in clockwise direction by one tooth of the ratchet wheel 18. Accordingly, the roller 24 rolls on the profile of the control template 20A over one tooth, thereby displacing the control slide by the height of the tooth. As a result of this movement the slide 26, rotatab'y mounted on the control slide 23, moves transversely in accordance with the setting of the eccentric bush 31, thereby giving transverse movement to the foot 27, as described above. The foot 27 accordingly shifts the material laterally, and the needle, passing through the slot 78 in the foot base 71 applies the ornamental stitching to the material as it is automatically shifted according to the setting of the device.

The upward movement of the needle rod 19 also causes the segment 66 of the lever 9 to be pressed against the rollers 67 of the double lever 68. The latter is thereby pivoted in anti-clockwise direction and the pressure part 70 is pressed vertically against the material mover 62 and this onto the material.

The upward movement of the needle rod 19 likewise causes the lower stop of the slot 50 on the lever 9 to press on to the balance 48 whereby the taker bolt 51 (FIG. 6) is pivoted in anti-clockwise direction and the forked lever is moved according to the slct tilt on the slide 57 and its movement is transmitted via the link 54 to the material mover 62. The material is thereby moved in a certain sewing direction, that is, forwards or backwards, laterally and simultaneously, corresponding to the adjustment effected.

Upon subsequent downward and upward movement of the needle rod 19 the previously described operations are repeated.

As already explained, by operation of the knob 32 the slide 26 can be pivoted upon the control slide 23. This results in increased or decreased lateral movement of the material for the production of zig zag and ornamental stitching within certain limits according to the scale setting, as the stitching F and G illustrated in FIG. 15.

In addition by turning the knob 32 from the left side of the scale 34 to the right side or vice versa it is possible to produce patterns placed in mirror image like as FIG. 14 shows. The stitching illustration H can be varied in this manner as a mirror image J.

As likewise described the lever 38 serves for the movement of the stitching position from the center to the left or right. This variation renders possible a further multiplicity of zig zag and ornamental patterns, such as, for example, the stitching K and L shown in FIG. 15. Such stitch displacement offers the possibility of making button holes.

Operation of the lever 63, as described above, serves for the selective adjustment of the material movement between zero and four millimetres, forwards as well as backwards. Adjustment of the lever 63 over the scale 64 effects forward movement; the adjustment over the scale 65 effects backward movement. FIG. 14 shows for example a stitching varied from J to M as produced by movement of the lever 63 from number 1 to number 2 of the scale 64. By changing the stitch length by means of the lever 63, by changing the width of the patterns by means of the knob 32 and of the stitch position lever 38 as well as by rhythmic adjustment of all three said control members, an unlimited number of stitch patterns and stitch variations can be obtained which hitherto could only be produced on expensive automatic sewing machines.

The template sensing apparatus may take a variety of forms, some of which will now be indicated.

Figure 1:
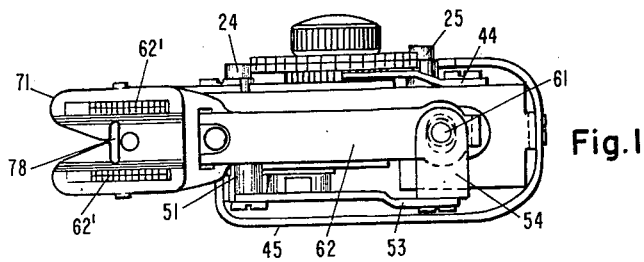
FIG. 1 shows a view of a first embodiment of the additional apparatus seen from below.
Figure 16:
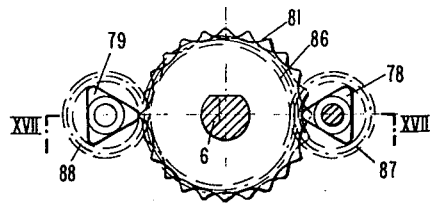
FIG. 16 shows another embodiment of the sensing apparatus of the template in side view.
Figure 17:
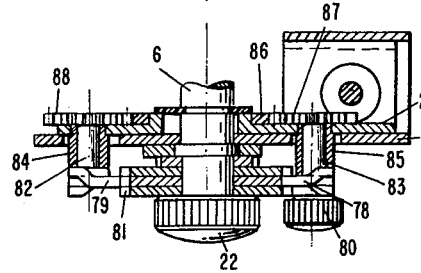
FIG. 17 shows a section on line XVII—XVII of FIG. 16.

FIGS. 16 and 17 show another embodiment of the template sensing apparatus. Instead of the two rollers 24 and 25 (FIG. 1) two feelers 78 and 79 are provided Instead of two, three templates 81 are arranged on the axle 6. The feelers 78 and 79 are so constructed that upon rotation of the knob 80 selectivey each one of the three templates 81 is sensed on its profile. The two feelers 78 and 79 have three sensing surfaces and are rotatable with the axles 82 and 83 in the bearing bushes 84 and 85 firmly connected to the axles 82 and 83. The rotation of the knob 80 and thereby the feeler 78 effects simultaneously a rotation of the feeler 79 as a toothed wheel 87 firmly located on the axle 83 is in engagement with the toothed wheel 88 firmly located on the axle 82 via an intermediate wheel 86 rotatably mounted on the control slide 23.

By the sensing of each of the three exchangeable templates further possibilities of combination for the production of ornamental stitches are presented and also the manipulation is simplified.

Figure 18:
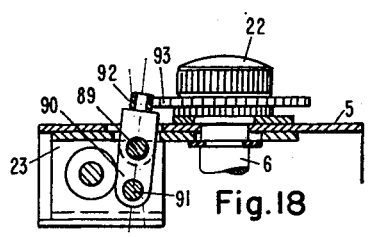

A further embodiment of the sensing apparatus is shown in FIG. 18. Within the casing of the apparatus 5 there is mounted a bolt 89 around which a double lever 90 is pivoted intermediate its ends upon this bolt. One end of the lever 90 is swiveled at 91 to the control slide 23. The other end of which carries a roller the lever 90 rolls on the profile of a template 93. A spring element (traction, pressure or torsion spring, not shown) effects the positive connection between the exchangeable template 93 and the slide.

Figure 19:
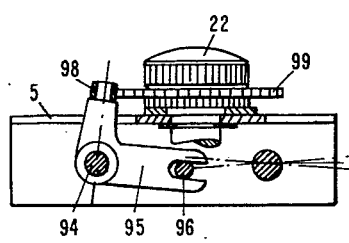

In a further embodiment of the sensing apparatus shown semi-diagrammatically in FIG. 19 there is mounted on the casing of the apparatus 5 a bolt 94 around which a bell crank lever 95 is pivoted. One end of the bell crank lever contacts the engaging point 96 of the foot 97 constructed as a double lever and the other end of which carries a roller 98 which rolls on the profile of a template 99. A spring element (traction, pressure or torsion spring, not shown) effects the positive connection between the exchangeable template 99 and the angle lever 95.

Figure 20:
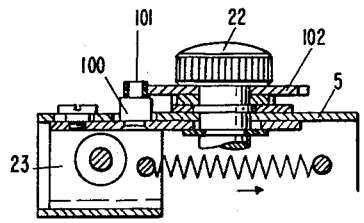
FIGS. 18–21 show various other embodiments of the sensing apparatus for the stitch width adjustment.

In the embodiment of the sensing apparatus shown in FIG. 20 there is mounted on the control slide 23 a bolt 100 the free end of which carries a roller 101. This engages the teeth of a template 102. A spring element effects the positive connection between the exchangeable template 102 and the slide 23.

Figure 21:
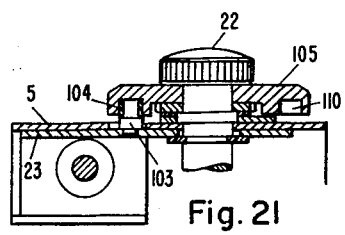

FIG. 21 shows a sensing apparatus with a template 105 the control came of which is arranged in a guide groove 110. In the control slide 23 a bolt 103 is mounted, the free end of which carries a roller 104. The latter rolls in the guide groove 110 of the exchangeable template 105.

Figure 22:
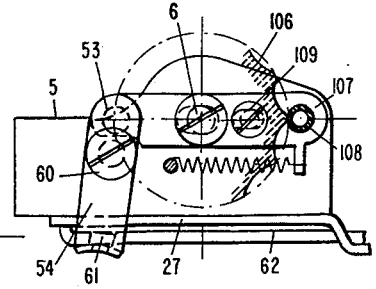
FIG. 22 shows another embodiment of the sensing apparatus for the advancing and reversing of the material.

FIG. 22 shows another embodiment of the sensing apparatus for the automatic forward conveying or backward conveying of the material mover 62. There is arranged on the axle 6 an exchangeable template 106 which is rotated step-by-step in the manner described above and the profile of which rolls on a roller 108 rotatably mounted on a slide 107. The slide 107 is held in a slit opening on the axle 6 and in a bolt 109 arranged in the casing 5 and is moved linearly according to the template profile height. These movements are transmitted in the link bolt 53 (FIGS. 6 and 7) to the link 54 mounted in the bearing bolt 60. On the bent end of the link 54 the bolt 61 firmly connected to it engages in a taker slot of the material mover 62 which at its end opposite the taker slot is so constructed that by means of a toothed port it can seize the material and can impart to it the desired movement.

Instead of only one roller 108, at the place of the guide bolt 53 a second roller may be provided so that the template 106 consisting of a control cam and an additional cam corresponding to the parts of the templates 20A and 20B transmit the impulses to the guide 54.

Furthermore, the lever 54 may carry at the guide point 53 a roller which is rolled on the profile of the template 106 and a spring element which effect the positive connection between the exchangeable template and the guide 54.

Figure 23:
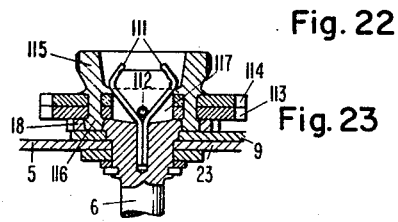
FIG 23 shows another embodiment of the fixing of the template on the axle.

FIG. 23 shows another embodiment of the template fixing means on the axle 6. This is in one piece with the ratchet wheel 18. Two springs 11 are axially held in it by a cross rod 112. The templates 113 and 114 are made of steel and are provided with a plastic handle 115 as well as two taker cams 116 and are united compactly into a common template piece. This can now be placed on the axle part 117 and be held axially by means of the springs 111. At least two bores are provided in the ratchet wheel 18 for receiving the cams 116.

The template with handle 115 and cams 116 may be manufactured from moulded or cast plastic or may consist completely of metal.

The device described may be applied without trouble to any sewing machine. The built in material mover present in sewing mechines is not used and is covered by a cover plate even if it is arranged countersunk.

I claim:

1. A device for attachment on the material presser rod of a sewing machine for the automatic production of ornamental stitching, said device comprising a carrier fixed to the needle rod of the sewing machine, a lever associated with said carrier and reciprocated thereby, pawl-and-ratchet means operable by said lever in step-by-step rotation in one direction, a template fixed to said pawl-and-ratchet means for rotation therewith, a control slide reciprocable within the device, rollers carried by said control slide in contact with the profile of said template whereby said control slide is reciprocated, and an adjustable slide rotatably connected to said control slide for movement therewith, in combination with a foot pivoted to said device intermediate its ends for transverse horizontal reciprocation, said foot having at one end a material-moving foot base and a transverse slot through which the needle of the sewing machine passes, and a pivotal connection between said adjustable slide and the other end of said foot for reciprocating said foot and the material being stitched beneath the sewing machine needle.

2. A device according to claim 1, wherein said template comprises a single control cam, and wherein a spring moves said control slide in one direction and holds a roller against said template.

3. A device according to claim 1, wherein said template has a circular groove therein in which said roller follows said template.

4. A device according to claim 1, wherein said template comprises three control cams, and wherein said rollers comprise three followers.

5. A device according to claim 1, wherein said template comprises two control cams, a handle holds said cams together, and a spring attaches said handle to the shaft of said device.

6. A device for attachment on the material presser rod of a sewing machine for the automatic production of ornamental stitching, said device comprising a carrier fixed to the needle rod of the sewing machine, a lever associated with said carrier and reciprocated thereby, pawl and ratchet means operable by said lever in step-by-step rotation in one direction, a template having two control cams fixed to said pawl and ratchet means for rotation therewith, a control slide reciprocable within the device, two diametrically spaced rollers carried by said control slide in contact with the profile of said cams, one cam coacting with one of said rollers and the other cam coacting with the other of said rollers to reciprocate said control slide as said template rotates, an adjustable slide rotatably connected to the control slide for movement therewith, a foot pivoted to the device intermediate its ends for transverse horizontal reciprocation, said foot having at one end a material-moving foot base and a transverse slot through which the needle of the sewing machine passes, the other end of said foot being pivotally connected to the adjustable slide for reciprocating said foot and the material being stitched, a balance pivotally mounted in the device and operatively connected to the lever for turning thereby, a slide adjustably mounted in the device, a slide block carried in said slide, said slide block being connected to said balance for movement thereby during each up-and-down movement of the lever, and a lever system connecting said slide block to the material-moving foot base whereby the material-moving foot base is shifted longitudinally responsive to the position of the slide.

References Cited in the file of this patent

UNITED STATES PATENTS

| | | |
|---|---|---|
| 1,558,118 | Serafini | Oct. 20, 1925 |
| 1,903,671 | Hacket | Apr. 11, 1933 |
| 2,432,992 | Hickey | Dec. 23, 1947 |
| 2,820,425 | Enos | Jan. 21, 1958 |
| 2,825,295 | Baehr | Mar. 4, 1958 |
| 2,906,219 | Vigorelli | Sept. 29, 1959 |
| 2,907,290 | Burgess et al. | Oct. 6, 1959 |
| 2,952,228 | Baehr et al. | Sept. 30, 1960 |

FOREIGN PATENTS

| | | |
|---|---|---|
| 1,153,315 | France | Sept. 30, 1957 |